(12) United States Patent
Perelman et al.

(10) Patent No.: US 10,935,030 B2
(45) Date of Patent: Mar. 2, 2021

(54) FLANGELESS COUPLING HAVING AN EMBEDDED RING SEGMENT JOINING COMPONENTS OF A SUBMERSIBLE PUMP UNIT

(71) Applicant: JOINT STOCK COMPANY "NOVOMET-PERM", Perm (RU)

(72) Inventors: Maksim Olegovich Perelman, Perm (RU); Yevgenii Vyacheslavovich Poshvin, Perm (RU); Ilia Nikolayevich Zubenin, Perm (RU); Danila Nikolayevich Martiushev, Perm (RU); Dmitrii Valeryevich Gorbunov, Perm (RU); Yuriy Valentinovich Danchenko, Perm (RU)

(73) Assignee: JOINT STOCK COMPANY "NOVOMET-PERM", Perm (RU)

( * ) Notice: Subject to any disclaimer, the term of this patent is extended or adjusted under 35 U.S.C. 154(b) by 152 days.

(21) Appl. No.: 16/061,388

(22) PCT Filed: Dec. 15, 2016

(86) PCT No.: PCT/RU2016/000889
§ 371 (c)(1),
(2) Date: Jun. 12, 2018

(87) PCT Pub. No.: WO2017/111661
PCT Pub. Date: Jun. 29, 2017

(65) Prior Publication Data
US 2018/0355871 A1 Dec. 13, 2018

(30) Foreign Application Priority Data

Dec. 25, 2015 (RU) ................................ 2015156079
May 24, 2016 (RU) ................................ 2016120229

(51) Int. Cl.
*F04D 13/08* (2006.01)
*F04D 29/64* (2006.01)
(Continued)

(52) U.S. Cl.
CPC .......... *F04D 13/086* (2013.01); *E21B 43/128* (2013.01); *F04D 13/10* (2013.01);
(Continued)

(58) Field of Classification Search
CPC .... F04D 29/648; F04D 29/406; F04D 29/528; F04D 13/062; F16L 37/138; F16L 37/14; F16L 37/22
See application file for complete search history.

(56) References Cited

U.S. PATENT DOCUMENTS

| 4,928,771 A | 5/1990 | Vandevier |
| 5,409,324 A * | 4/1995 | Johnson, Jr. .............. F16D 1/02 285/330 |

(Continued)

FOREIGN PATENT DOCUMENTS

| RU | 2310772 C1 | 11/2007 |
| RU | 109513 U1 | 2/2011 |

(Continued)

OTHER PUBLICATIONS

International search report for corresponding PCT application No. PCT/RU2016/000889, dated May 4, 2017.

*Primary Examiner* — Bryan M Lettman
*Assistant Examiner* — Timothy P Solak
(74) *Attorney, Agent, or Firm* — Notaro, Michalos & Zaccaria P.C.

(57) ABSTRACT

A small-sized submersible pump unit having a submersible motor, discharge module, pump housings which are connected by flangeless coupling is disclosed. The flangeless coupling is made using embedded ring segments. The (Continued)

coupled housings each have the covering and the covered parts, and the covered part of one of the housings contains a blind rectangle groove, and the covering part of another housing has a through rectangle groove, and the grooves form a cavity having an embedded ring segment.

8 Claims, 7 Drawing Sheets

(51) Int. Cl.
*F04D 29/42* (2006.01)
*F04D 29/40* (2006.01)
*F04D 29/62* (2006.01)
*F04D 29/52* (2006.01)
*F16L 37/138* (2006.01)
*F04D 13/10* (2006.01)
*F16L 37/14* (2006.01)
*F16L 37/22* (2006.01)
*F04D 29/08* (2006.01)
*F04D 29/70* (2006.01)
*E21B 43/12* (2006.01)
*E21B 47/12* (2012.01)

(52) U.S. Cl.
CPC ......... *F04D 29/086* (2013.01); *F04D 29/406* (2013.01); *F04D 29/426* (2013.01); *F04D 29/528* (2013.01); *F04D 29/628* (2013.01); *F04D 29/648* (2013.01); *F04D 29/708* (2013.01); *F16L 37/138* (2013.01); *F16L 37/14* (2013.01); *F16L 37/22* (2013.01); *E21B 47/12* (2013.01)

(56) References Cited

U.S. PATENT DOCUMENTS

| 6,415,869 | B1* | 7/2002 | Smith | E21B 17/028 166/381 |
| 6,860,525 | B2* | 3/2005 | Parks | F16L 37/105 285/371 |
| 8,505,984 | B2* | 8/2013 | Henderson | F16L 37/23 285/330 |
| 2011/0274565 | A1* | 11/2011 | Tetzlaff | F04B 47/06 417/321 |
| 2012/0211240 | A1 | 8/2012 | Xiao et al. | |
| 2014/0069629 | A1 | 3/2014 | McCann | |
| 2015/0184670 | A1* | 7/2015 | Hill | E21B 43/128 417/414 |
| 2015/0354327 | A1* | 12/2015 | Semple | E21B 43/128 417/53 |

FOREIGN PATENT DOCUMENTS

| RU | 120695 U1 | 5/2012 |
| RU | 2571790 C1 | 12/2015 |
| SU | 408054 | 12/1973 |

* cited by examiner

US 10,935,030 B2

FLANGELESS COUPLING HAVING AN EMBEDDED RING SEGMENT JOINING COMPONENTS OF A SUBMERSIBLE PUMP UNIT

APPLICATIONS ACCORDING TO WHICH THE PRIORITY IS REQUESTED

The priority of RU2016120229 application is requested according to this Application filed on May 24, 2016, of RU2015156079 application filed on Dec. 25, 2015 that are included herein in full by reference for all purposes.

FIELD OF THE INVENTION

The invention relates to oil production equipment, more particularly, to small-sized submersible pump units that are run in holes on a carrying cable within an additional pipe.

BACKGROUND OF THE INVENTION

Submersible pump unit designed for pumping out of oil-water-gas mixture from wells that have engineering constraints in the form of reduced flow area the stock of which inevitably grows as fields mature, and from offshoots the diameter of which is less than the diameter of the vertical well bore are known in the prior art.

A submersible pump unit run in a casing pipe on a carrying cable is known comprising of a load-bearing coupling, oil-filled submersible motor, motor seal, discharge module, centrifugal pump, inlet module and a packer with a valve (U.S. Pat. No. 4,928,771 published on 29 May 1990).

The disadvantage of said submersible pump unit is that when it is operated the casing pipe is affected by high pressure of the fluid being pumped out that is equal to the discharge pressure of a pump. Furthermore, the casing pipe is affected by corrosion, wear, and deposition of hardness and paraffin is possible on its surface. Also, flangeless coupling is not disclosed in this solution.

There is a known submersible pump unit run in a casing pipe with an additional column comprising a load-bearing coupling, oil-filled submersible motor, motor seal, discharge module, electric centrifugal pump, suction duct with a check valve, seal between the additional column and the casing pipe, and a seal between the centrifugal pump and the additional column connected in sequence (SU 408054 published on 10 Dec. 1973). Also, flangeless coupling is not disclosed in this solution.

The disadvantage of such submersible pump unit is low reliability of the oil-filled submersible motor due to low oil capacity within single motor seal. Furthermore, the submersible unit is used, for the most part, to pump out iodine-bromide water deposited near the surface that contains no mechanical inclusions since the check valve located at the lower part of the suction duct does not prevent the motor from clogging. Also, flangeless coupling is not disclosed in this solution.

There is a known small-sized submersible pump unit run in the casing pipe by means of oil well tubing lift that comprises an electric centrifugal pump, inlet module, motor seal, AC electric motor, and electric cable with flat insulated conductors (RU 109513 published on 20 Dec. 2011).

The approach used to reduce the size of a pump unit by using an electric cable with flat conductors distributed over the circumference has limited prospects since the conductors being fastened to the unit side surface make reduction of its cross dimension under 82 mm impossible. Also, flangeless coupling is not disclosed in this solution.

There is a known submersible pump unit run in the casing pipe with an additional pipe on a carrying cable and comprising a load-bearing coupling, discharge module, pump sections with a seal element at the top, inlet module, motor seal, oil-filled motor, safety valve, and an external seal element located downright (US 2012/0211240 published on 23 Aug. 2012).

The disadvantage of the submersible pump unit is that low location of the motor provides for installation of electric supply cable outside the pump section and motor seal. This makes the pump unit dimensions bigger and results in increase of the additional pipe diameter and, consequently, the diameter of a pipe the unit is run in. Furthermore, a cable installed within the annular clearance between the pump unit, motor seal and additional pipe requires anti-corrosion protection since the velocity of liquid being pumped out in the flow part may reach up to tens of meters a second. Also, flangeless coupling is not disclosed in this solution.

Small-sized submersible pump unit run on a carrying cable comprising a load-bearing coupling, submersible telemetry unit, submersible oil-filled motor, electromagnetic coupling, motor seal, flexible coupling, discharge module, pump and tail joint connected together using a threaded flangeless coupling (US 2014/0069629 published on 13 Mar. 2014).

The disadvantage of the submersible pump unit taken as a prototype is its poor reliability during operation which can be principally explained by reduced inner diameter of flow area at the threaded connection portion that results in reduction of volume of formation fluid lifted to the surface which is accompanied by overheating of the submersible motor. Usage of threaded flangeless coupling of housings and components thereof requires their accurate axial alignment prior to coupling and usage of special tools that makes mounting more difficult and increases the time of the unit mounting on a well.

DISCLOSURE

The technical problem is improvement of the pump unit functioning reliability and improvement of mounting convenience.

The technical result is improvement of reliability of small-sized submersible pump unit in operation, elimination of submersible motor overheating, and simplification of the pump unit mounting.

Said technical result is achieved by connection of housings of elements constituting this unit together by flangeless coupling, and said flangeless coupling is provided with embedded ring segments in the submersible pump unit.

Flangeless coupling of the claimed design guarantees stability of the flow area diameter without reduction of the volume of formation fluid being lifted to the surface and, therefore, excludes overheating of the submersible oil-filled motor.

Furthermore, flangeless coupling of the claimed design provides for reliable connection of the small-sized submersible pump unit components, is simple, readily producible and convenient for mounting on a well.

According to additional aspects of the invention, protection of the pump unit against hydraulic impacts during running, and against ingress of formation fluid during operation is provided, as well as elimination of mechanical wear and jamming of operating devices of the unit pump which is achieved by installation of additional upper motor seal over the submersible telemetry unit, and the discharge module houses a check valve.

Additional upper motor seal of the claimed design functioning in tandem with the lower motor seal provides reliable protection against ingress of formation fluid to inner cavities of the submersible oil-filled motor, quick-operating compensation for oil volume change with pressure equalization caused by temperature fluctuations during operation, and against the unit motor stopping.

When the pump is turned off, availability of check valve located in the discharge module prevents mechanical particles from the additional column from deposition at the upper pump stages, thus providing protection of the pump operating devices from wear and improving reliability of the small-sized pump unit during operation process.

One of the aspects discloses a small-sized submersible pump unit comprising a submersible motor, discharge module, and pump the housings of which are connected with each other by flangeless coupling
characterized in that
flangeless coupling is made using embedded ring segments, whereas the coupled housings have the covering and the covered parts, and the covered part of one of the housings comprises a blind rectangle groove, and the covering part of another housing comprises a through rectangle groove, and said grooves form a cavity comprising an embedded ring segment.

Additional aspects disclose that the embedded ring segment has the cylindrical drilling-through aflush with the covered part of the housing that is overlapped by the covering part of the housing, whereas the covered part of one housing has a thread, and the covering part of another housing is fastened by a sleeve nut screwed on the thread of the covered part of the housing.

Additional aspects disclose that the covering part of the housing has a spring split bush put thereon, the embedded ring segment is connected with the spring split bush, and internal tapered drilling-through is made on the embedded ring segment at the level of the cylindrical drilling-through.

Additional aspects disclose that a submersible telemetry unit is installed over the submersible motor.

Additional aspects disclose that an upper motor seal is installed over the submersible telemetry unit.

Additional aspects disclose that the upper motor seal has a leak-tight central duct with electric conductors the ends of which are fastened in receptacles.

Additional aspects disclose that the pump unit additionally comprises a lower motor seal between the submersible motor and the discharge module.

Additional aspects disclose that there is a check valve located in the discharge module.

Additional aspects disclose that the pump unit additionally comprises a load-bearing coupling.

Additional aspects disclose that the pump unit additionally comprises a tail joint.

According to one of the aspects of the claimed solution, the embedded ring segment in a flangeless coupling is located in a cavity formed by a blind rectangle groove within the covered part of the housing and by a through rectangle groove within the covering part of the adjacent housing. There is the cylindrical drilling-through made aflush with the covered part of the housing on the embedded ring segment that is overlapped by the covering part of the adjacent housing that is fastened by a sleeve nut screwed on the thread of the covered part of the housing.

According to another aspect of the claimed solution, the embedded ring segment within the flangeless coupling with a spring split bush put on the covering part of the housing, and internal tapered drilling-through is made on the embedded ring segment at the level of the cylindrical drilling-through.

According to another aspect of the claimed solution, additional upper motor seal has a leak-tight central duct with electric conductors the ends of which are fastened in receptacles.

EMBODIMENT

Figure 1:
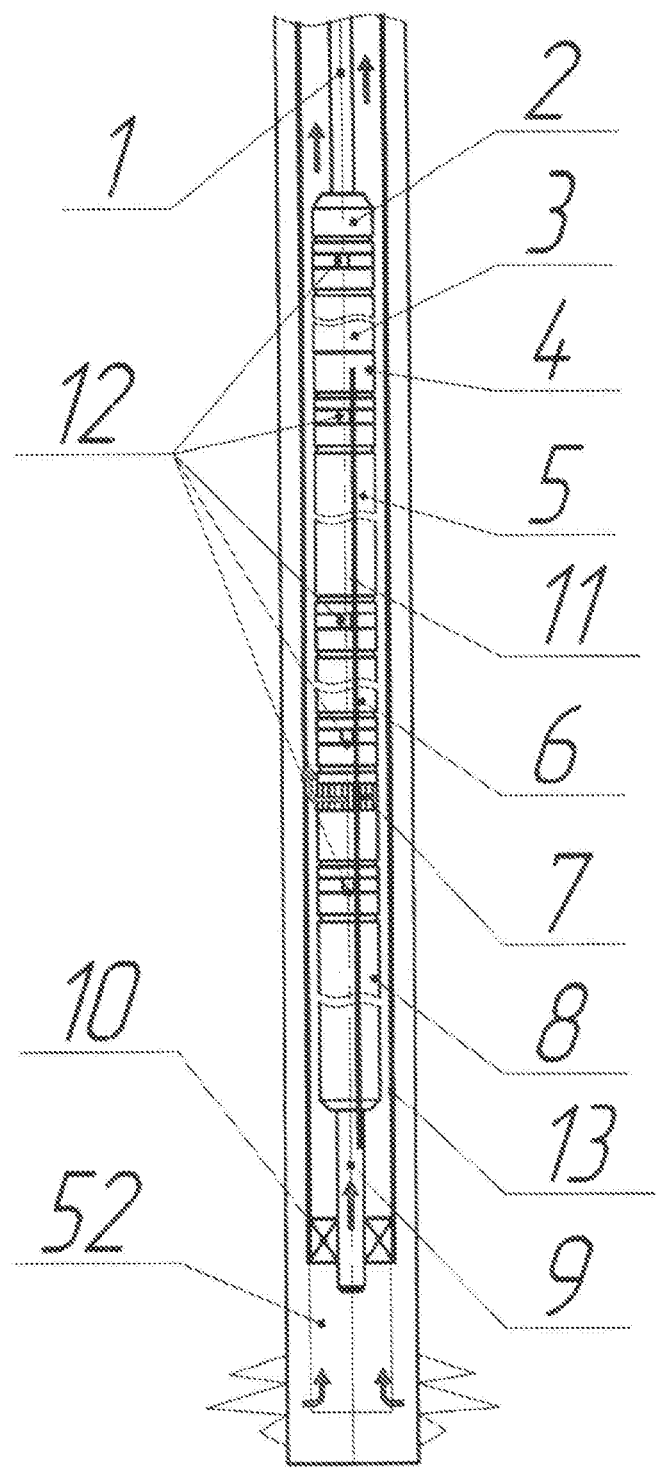
FIG. 1 outlines the claimed small-sized submersible pump unit.
Figure 2:
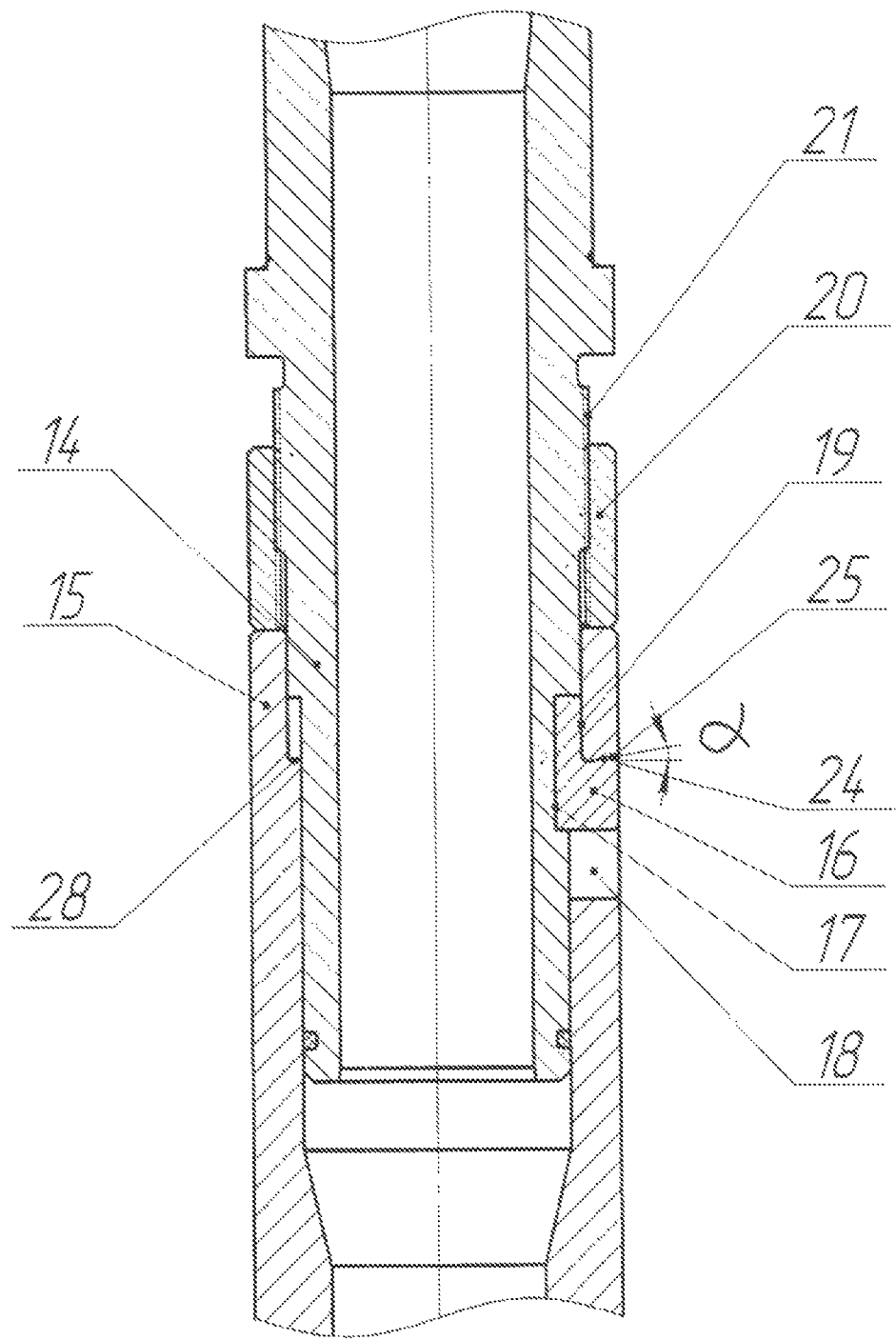
FIG. 2 shows the flangeless coupling of claimed unit component housings.
Figure 3:
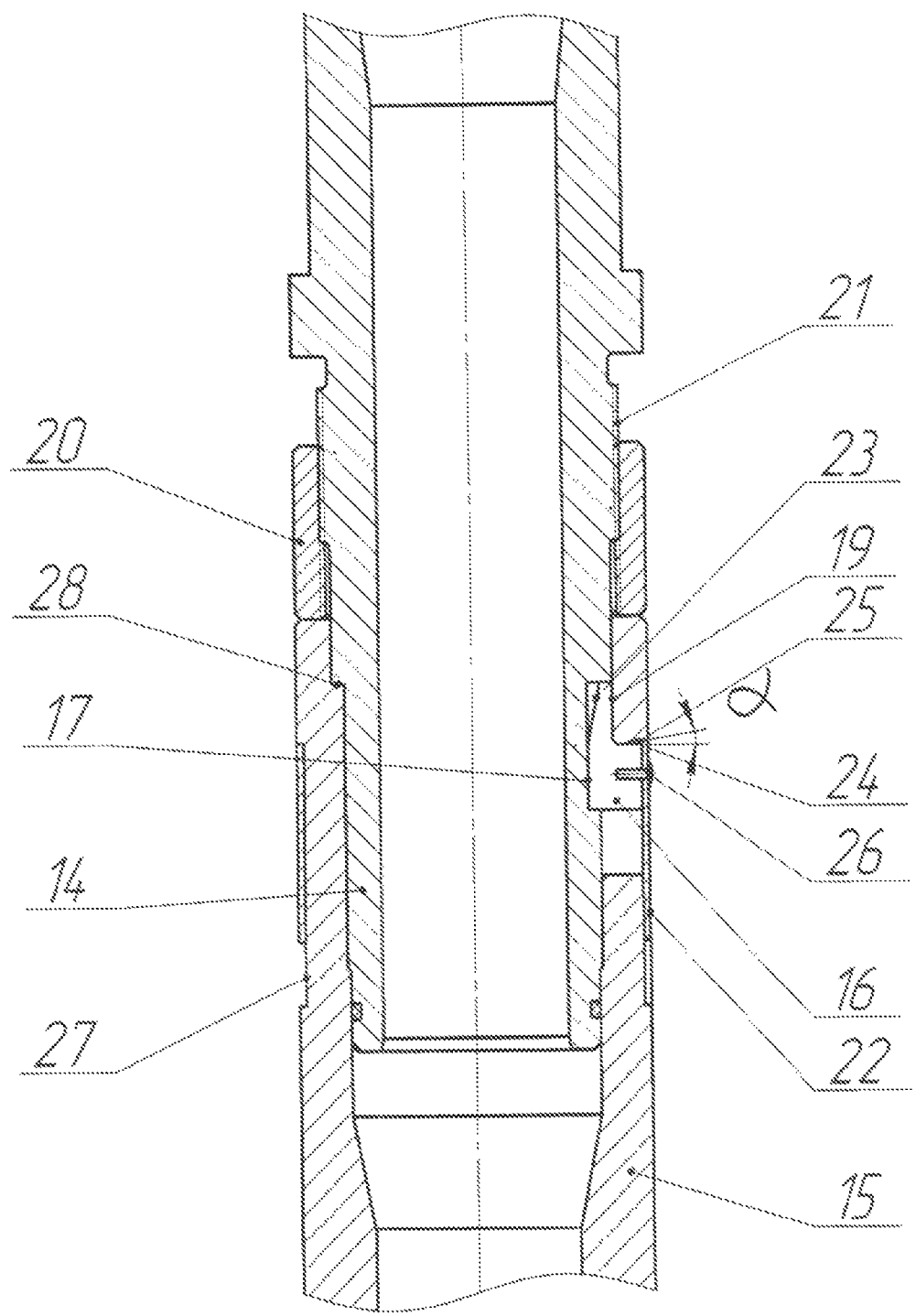
FIG. 3 shows the flangeless coupling of the unit component housings with split bush.
Figure 4:
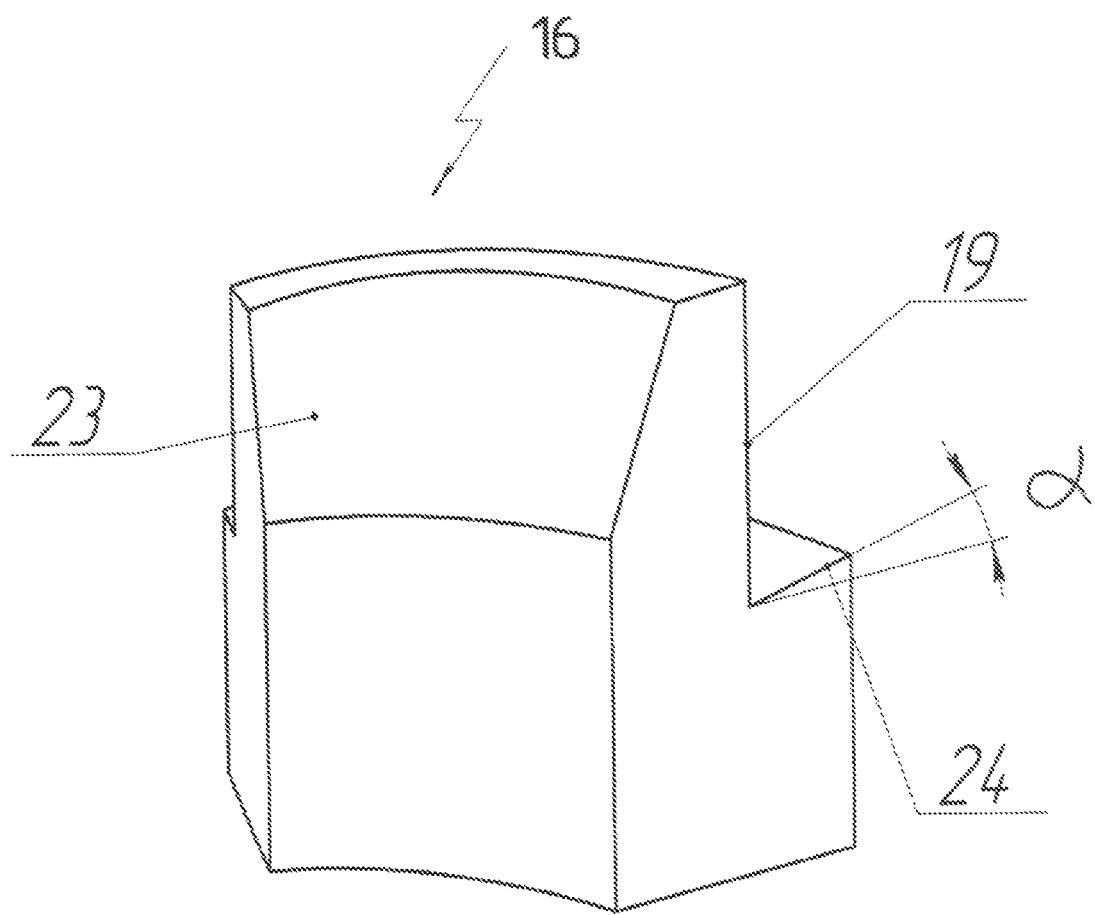
FIG. 4 shows the embedded ring segment.
Figure 5:
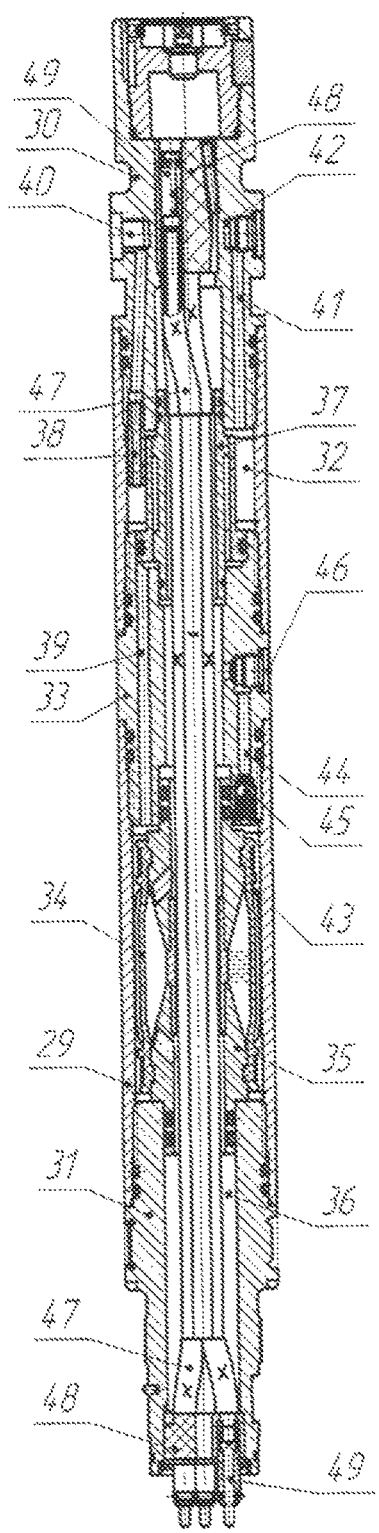
FIG. 5 shows design of the additional upper motor seal.
Figure 6:
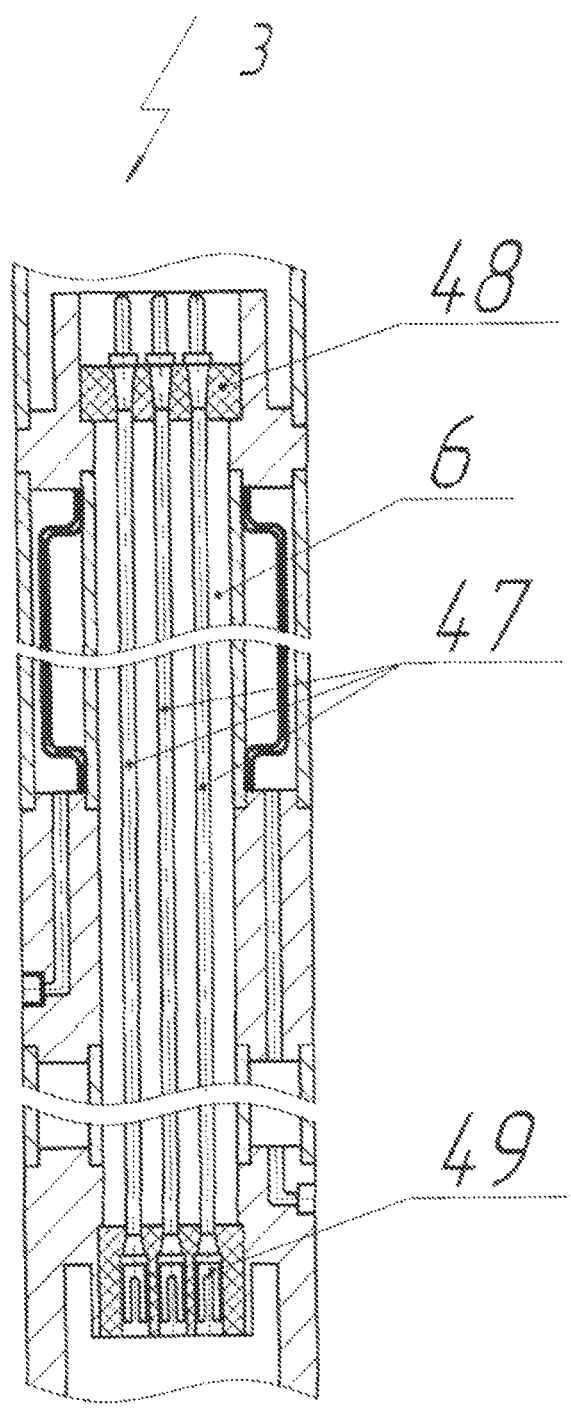
FIG. 6 shows the leak-tight central duct of the additional upper motor seal with electric conductors.
Figure 7:
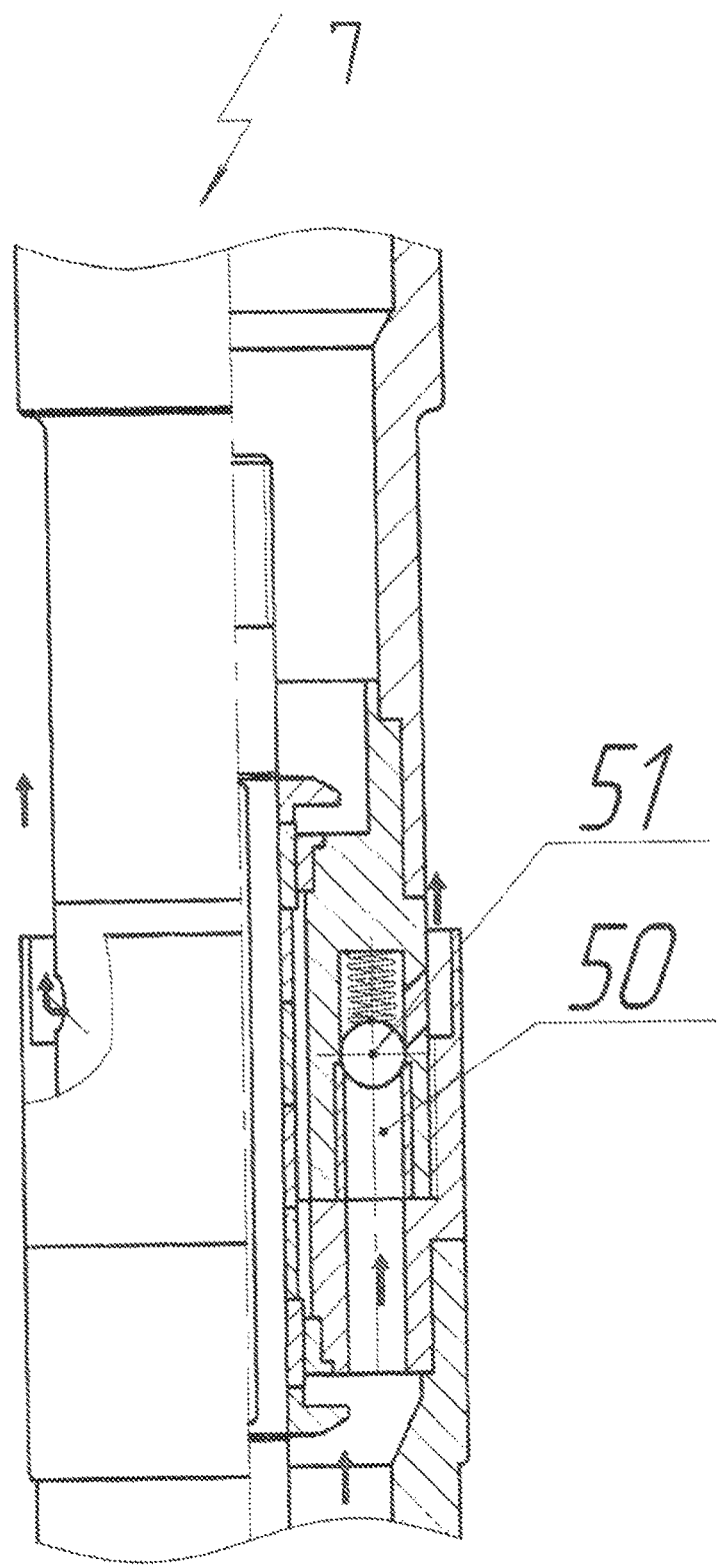
FIG. 7 shows the discharge module.

In one embodiment load-bearing coupling 2, upper motor seal 3, submersible telemetry unit 4, oil-filled submersible motor 5, lower motor seal 6, discharge module 7, centrifugal pump 8, tail joint 9 with external seal element 10 connected by means of capillary tubing 11 with submersible telemetry unit 4 are connected in series to carrying cable 1 in the claimed small-sized submersible pump unit. Component housings of small-sized submersible pump unit have the outer diameter of 55 mm and are joined together by means of flangeless coupling. The submersible pump unit is placed in additional pipe 13 with the inner diameter of 66 mm.

Each component housing of the unit has covered and covering parts at the opposite ends joined by means of flangeless coupling, 14 and 15 correspondingly. Embedded ring segments 16 are put in the cavity formed by blind rectangle grooves 17 provided in covered part 14 of the housing and by through rectangle grooves 18 in covering part 15 of the adjacent housing.

In one embodiment embedded ring segments 16 in the amount of 3 pieces are located at regular intervals from each other in circumferential direction. Embedded ring segments 16 are adjacent to the bottom and cross walls of blind groove 17, and their cylindrical drilling-through 19 is aflush with covered part 14 of the housing and is overlaid by covering part 15 of the adjacent housing which is fastened by sleeve nut 20 screwed at external thread 21 of covered part 14 of the housing. For convenience of mounting embedded ring segment 16 may be attached to spring split bush 22 put on covering part 15 of the adjacent housing, moreover, lead tapered drilling-through 23 is made at embedded ring segment 16.

Shape and dimensions of embedded ring segment 16 are determined on the basis of strength calculations. Step 24 of the cylindrical drilling-through 19 of embedded ring segment 16 is inclined to drilling-through 17 from diametral plane at an angle of 8-12 degrees. Angled wall 25 adjacent to step 24 has the same inclination angle of through groove 18 ensuring the maximum contacting surface of covering part 15 of the housing with embedded ring segment 16.

Embedded ring segment 16 may be connected to spring split bush 22 serving as an attachment point by means of sliding joint using screw 26. Spring split bush 22 is installed at grooved part 27 of covering part 15 with possibility of movement in axial and circumferential directions. External thread 21 at covered part 14 of the housing ends near the face plane of covering part 15 of the housing. Covering part 15 of the housing is equipped with rest 28 fastening the position at which through groove 18 aligns with blind groove 17.

The outer diameter of flangeless coupling 12 does not exceed the housing diameter of any submersible pump unit component and pump flow area 8 in the junction points of housings has no reduction that allows saving of pumped formation fluid volume.

Upper motor seal 3 located above submersible motor 5 comprises assembled housing 29 with head 30 and bed 31 at the ends. Labyrinth style chamber 32, nipple 33, and flexible diaphragm 34 sealably fastened at lower support 35 are sequentially arranged below head 30. Leak-tight central duct 36 through internal cavities of head 30, upper support 37 and lower support 35, as well as through central holes of nipple 33 and beds 31 is formed along the axis of upper motor seal 3. Labyrinth style chamber 32 located between nipple 33 and head 30 has upper support 37, tube 38 inserted into head 30 and hydraulically connected to inner annulus (formation fluid) by means of valve 39 connected with hole 40. Head 30 has duct 41 for oil flow connecting labyrinth style 32 with hole 42 sealed with plug and designed for air removal in case of oil filling of motor seal cavities and motor 5 during installation.

Diaphragm vessel 43 is formed around diaphragm 34. Depressurizing check valve 45 is installed in nipple lower part 33 inside fluid passage 44. Passage 44 in the upper part is connected to inner annulus for air removal through hole 46 sealed with a plug, as well as to leak-tight central duct 36.

Isolated electric conductors 47 are laid inside oil-filled leak-tight central duct 36. Upper and lower ends of conductors 47 are attached by means of threaded connection to liners 48 located in receptacles 49 arranged in head 30 and bed 31.

Electric conductors 47 in upper motor seal 4, submersible telemetry unit 4 and submersible motor 5 are arranged within the loop limited by flangeless coupling 12, thereby the submersible pump unit with dimensions of 55 mm maximum may be used.

Check valve 51 with possibility of duct 50 closure is installed in outlet duct 50 of discharge module 7 in order to prevent entering of fine particles from additional pipe 13 into pump 8.

Function of seal element 10 between tail joint 9 and additional pipe 13 may be provided by means of elastomeric coating expanding when contacting with formation fluid or mechanical packer.

Well strainer 52 is connected to tail joint 9 for work in the wells with high content of solid particles.

Submersible pump unit is mounted as follows.

Additional pipe 13 with the inner diameter of 66 mm is put to the design depth into the casing pipe with engineering constraints and is fastened at the well head by means of X-mas tree. Then the submersible pump unit components housings of which have the outer diameter of 55 mm are run in additional pipe 13 in sequence starting with tail joint 9 with attached external seal element 10 and capillary tubing 11. Upper end of capillary tubing 11 is connected to submersible telemetry unit 4. Load-bearing coupling 2 with carrying cable 1 are run in last of all. Unit components are joined together by means of flangeless couplings 12 which are mounted in sequence at covered 14 and covering 15 parts of the adjacent housings, more particularly, 8-7, 7-6, 6-5, 5-4, 4-3, 3-2 in the following sequence.

Covered part 14 of the housing with screwed on sleeve nut 20 is inserted into covering part 15 of the adjacent housing, matching their blind 17 and through rectangle 18 grooves and putting embedded ring segments 16 into the formed cavities. Embedded ring segments 16 are preliminary arranged at spring split bush 22 in order to ease the installation by excluding manual embedding. The cylindrical drilling-through 19 at embedded ring segments 16 are overlaid by covering part 15 of the adjacent housing during further axial movement of covered part 14. Fastening of embedded ring segments 16 and correspondingly position of the adjacent housings are provided by sleeve nut 20 moving along external thread 21. As a result mutual axial and radial offsets of the connected unit component housings are avoided.

In case of contact with formation fluid in the area of pump unit hanger seal element 10 expends in diameter and overlays the annular clearance between tail joint 9 and additional pipe 13. Then the submersible pump unit is ready for operation.

When starting submersible motor 5 torque from its shaft is transferred through the shaft of lower motor seal 6 and the shaft of discharge module 7 to the shaft of pump 8. The formation fluid is absorbed through well strainer 52, cleared from rock particles and supplied to pump 8 inlet through tail joint 9. After passing pump 8 the formation fluid gets into outlet duct 50 of discharge module 7. Outlet pressure built up with pump 8 opens check valve 51; the formation fluid is supplied to additional column 13 through duct 50 and then to the surface.

During motor 5 operation oil heats up and expands, furthermore its increasing pressure is transferred to upper motor seal 3 through receptacles 49 to leak-tight central duct 36 in lower support 35, then to the cavity of diaphragm 34 and through fluid passage 44 back to depressurizing check valve 45. When the pressure in fluid passage 44 exceeds the set value, depressurizing check valve 45 is opened, oil is supplied through duct 39 to the cavity of labyrinth style chamber 32 from which goes up through tube 38 to hole 40 and leaks to the inner annulus.

When motor 5 is stopped and oil is cooled down to the temperature of the formation fluid its volume will decrease and pressure will drop. Furthermore, oil volume leaked to the inner annulus during check valve 45 trip is displaced with the formation fluid supplied through hole 40 to tube 38 and then to labyrinth style chamber 32. At the same time, depressurizing check valve 45 and passage 44 are closed. In such a way pressure of oil in upper motor seal 3 and in motor 5 is equalized with pressure of the formation fluid in the well.

Upper motor seal 3 functioning in tandem with lower motor seal 6 provides reliable protection against ingress of formation fluid to inner cavities of submersible oil-filled motor 5, quick-operating compensation for oil volume change with pressure equalization caused by temperature fluctuations during operation, and against motor 5 stopping as a part of the pump unit.

Measurement of pump 8 inlet pressure is provided due to capillary tubing 11 connecting tail joint 9 with submersible telemetry unit 4.

Check valve 51 in discharge module 7 and outlet duct 50 are closed thereby preventing deposition of mechanical particles at the upper stages of pump 8 from additional column 13 when pump 8 is turned off, for example in case of blockage of well strainer 52 when exposed to the formation fluid head in additional column 13. The formation fluid is directly supplied to tail joint 9 and then to pump 8. Thus, clogging of pump operating devices is prevented and their protection against mechanical wear during subsequent start of the motor is provided improving reliability of the small-sized pump unit during operation process.

The embodiments are not limited by the embodiments described herein; other embodiments of the invention within the essence and scope of the invention will become apparent for any person skilled in the art on the basis of information specified in the description and background of the invention.

The elements mentioned in the singular do not exclude plurality of the elements, unless otherwise is specified.

The methods disclosed herein contain one or multiple steps or actions for obtaining of the described method. Steps and/or actions of the method may be substitute for one another staying within the limitations of the claims. In other words, if the specific procedure for steps and actions is not provided, procedure for and/or use of the specific steps and/or actions may be changed staying within the limitations of the claims.

Notwithstanding the fact that the applicable embodiments were described and shown in details in the accompanying drawings, it shall be understood that these embodiments are just exemplary and are not intended to constrain more broad invention and that this invention shall not be limited by the described and shown specific arrangements and designs as other different modifications may be apparent to the persons skilled in the art.

Features mentioned in different dependent claims, as well as implementations disclosed in different parts of the description may be combined with obtaining advantageous effects, even if the possibility of such combination is not clearly disclosed.

In the example description given above direction terms (i.e. "above", "top", "lower", 'bottom", "upper", "lower" and the like) are used for ease of reference to the accompanying drawings. In general "above", "upper", "top" and similar terms are related to direction to the earth surface, and "below", "lower", "down" and similar terms are related to direction from the earth surface.

The invention claimed is:

1. Submersible pump unit comprising a submersible motor, a discharge module, and a pump, housings of which are connected with each other by flangeless couplings
    characterized in that a flangeless coupling of the flangeless couplings is designed with embedded ring segments,
    wherein each coupled housing has a covering part and a covered part, and the covered part comprises a blind rectangle groove, and the covering part comprises a through rectangle groove, and said grooves form a cavity comprising an embedded ring segment,
    and the embedded ring segment has a cylindrical drilling-through flush with the covered part that is overlapped by the covering part, whereas the covered part has a thread, and the covering part is fastened by a sleeve nut screwed on the thread of the covered part,
    wherein the covering part has a spring split bush thereon, the embedded ring segment is connected with the spring split bush, and an internal tapered drilling-through is made at a step of the cylindrical drilling-through on the embedded ring segment.

2. Submersible pump unit according to claim 1 characterized in that there is a submersible downhole sensor unit installed above the submersible motor.

3. Submersible pump unit according to claim 1 characterized in that there is an upper motor seal installed above the submersible downhole sensor unit.

4. Submersible pump unit according to claim 1 characterized in that an upper motor seal has a leak-tight central duct with electric conductors the ends of which are fastened in receptacles.

5. Submersible pump unit according to claim 1 characterized in that it comprises a lower motor seal between the submersible motor and discharge module.

6. Submersible pump motor according to claim 1 characterized in that a check valve is located in the discharge module.

7. Submersible pump unit according to claim 1 characterized in that it comprises a load-bearing coupling.

8. Submersible pump unit according to claim 1 characterized in that it comprises a tail joint.

* * * * *